(12) United States Patent
Svihla et al.

(10) Patent No.: US 9,222,404 B2
(45) Date of Patent: Dec. 29, 2015

(54) COOLING ASSEMBLY HAVING MULTIPLE COOLERS

(71) Applicant: Electro-Motive Diesel Inc., LaGrange, IL (US)

(72) Inventors: Gary Robert Svihla, Burr Ridge, IL (US); Joshua David Schueler, New Lenox, IL (US); Jeffrey Paul Nowak, Munster, IN (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 264 days.

(21) Appl. No.: 13/870,278

(22) Filed: Apr. 25, 2013

(65) Prior Publication Data

US 2014/0318119 A1    Oct. 30, 2014

(51) Int. Cl.
*F02B 33/44* (2006.01)
*F02B 29/04* (2006.01)

(52) U.S. Cl.
CPC ........... *F02B 29/0412* (2013.01); *Y02T 10/146* (2013.01)

(58) Field of Classification Search
CPC ............. F02B 29/0412; F02B 29/0475; F02B 29/0462; F02B 29/04; F02M 25/0737; F01P 2060/02
USPC ........................ 60/612; 123/542, 563, 568.15
See application file for complete search history.

(56) References Cited

U.S. PATENT DOCUMENTS

| | | | |
|---|---|---|---|
| 3,257,797 A | 6/1966 | Lieberherr | |
| 5,109,674 A | 5/1992 | Sudmanns | |
| 5,544,486 A | 8/1996 | Lu | |
| 5,803,719 A | 9/1998 | Ramsden et al. | |
| 6,692,224 B2 | 2/2004 | Miura et al. | |
| 7,908,860 B2* | 3/2011 | Trombetta et al. | 60/612 |
| 8,234,864 B2 | 8/2012 | Easley, Jr. et al. | |
| 8,281,588 B2 | 10/2012 | Garrett et al. | |
| 2009/0071450 A1* | 3/2009 | Doring et al. | 123/563 |
| 2010/0303658 A1 | 12/2010 | Ito et al. | |
| 2011/0088663 A1* | 4/2011 | Dehnen et al. | 123/542 |
| 2011/0225977 A1 | 9/2011 | Kim et al. | |
| 2011/0252792 A1 | 10/2011 | Kares et al. | |
| 2011/0296828 A1 | 12/2011 | An et al. | |
| 2012/0181001 A1 | 7/2012 | Marsh et al. | |
| 2012/0325185 A1* | 12/2012 | Baumann et al. | 123/568.15 |

OTHER PUBLICATIONS

Dr. Johannes Kech et al., "Exhaust Gas Recirculation: Internal Engine Technology for Reducing Nitrogen Oxide Emissions", Engine Technology, MTU Friedrichshafen GmbH, www.mtu-online.com (Aug. 2011).

* cited by examiner

*Primary Examiner* — Thomas Denion
*Assistant Examiner* — Thomas Olszewski
(74) *Attorney, Agent, or Firm* — Finnegan, Henderson, Farabow, Garrett & Dunner, LLP

(57) ABSTRACT

A cooling assembly having multiple coolers is disclosed. The cooling assembly may include a housing at least partially defining a first chamber and a second chamber adjacent to the first chamber and substantially isolated from the first chamber. The housing may also at least partially define first and second inlets configured to direct air into the first chamber in parallel, and first and second outlets configured to direct air out of the second chamber in parallel. The cooling assembly may also include a first cooler disposed in the first chamber, and a second cooler disposed in the second chamber.

26 Claims, 8 Drawing Sheets

US 9,222,404 B2

COOLING ASSEMBLY HAVING MULTIPLE COOLERS

TECHNICAL FIELD

The present disclosure is directed to a cooling assembly and, more particularly, to a cooling assembly having multiple coolers.

BACKGROUND

A turbocharger compresses air prior to directing the air into an engine. Supplying the engine with compressed air ("charge air") may allow for more complete combustion of fuel within the engine. This may result in improved power density and better engine efficiency. However, compressing the air may also increase a temperature of the air. Supplying the engine with heated air may lead to an undesirable increase in the amount of emissions discharged from the engine. Also, because engines generally produce large quantities of heat already, adding heated air to the engine may increase the operating temperature of the engine, thus reducing efficiency and possibly resulting in excessive wear of engine components.

An inter-stage charge air cooler or intercooler is often disposed between a first compressor and a second compressor of a two-stage turbocharger arrangement and used to reduce engine emissions by cooling the air from the first stage compressor before it enters the second stage compressor. The intercooler lowers combustion temperatures and increases density of the air, thus improving engine thermodynamic efficiency, increasing engine power output, and extending engine component life. Also, disposing the intercooler between the first stage compressor and second stage compressor may increase the efficiency of the second stage compressor and the component life.

In addition to the intercooler, a primary charge air cooler or aftercooler is often located downstream of the second stage compressor, and used to further cool the air before it enters the engine. Like the intercooler, the aftercooler lowers combustion temperatures and increases the density of the air, thus further increasing engine efficiency, increasing engine power output, and improving engine component life.

An exemplary engine utilizing both an intercooler and an aftercooler is disclosed in U.S. Patent Publication No. 2010/0192890 of Brooks et al. that published on Aug. 5, 2010 (the '890 publication). Specifically, the '890 publication describes an engine with two-stage turbocharging, having an intercooler located between compressor stages and a completely separate aftercooler located downstream of a second compressor stage.

Although the engine of the '890 publication may include both an intercooler and an aftercooler, it may still be less than optimal. In particular, because the intercooler and the aftercooler of the '890 publication are separate assemblies, a significant amount of space and ducting may be required to connect these assemblies to the other components. This extra ducting may increase costs and decrease performance of the engine.

The cooling assembly of the present disclosure solves one or more of the problems set forth above and/or other problems of the prior art.

SUMMARY

In one aspect, the present disclosure is directed toward a cooling assembly. The cooling assembly may include a housing at least partially defining a first chamber and a second chamber adjacent to the first chamber and substantially isolated from the first chamber. The housing may also at least partially define first and second inlets configured to direct air into the first chamber in parallel, and first and second outlets configured to direct air out of the second chamber in parallel. The cooling assembly may also include a first cooler disposed in the first chamber, and a second cooler disposed in the second chamber.

In another aspect, the present disclosure is directed toward a method of handling combustion air for an engine. The method may include compressing the combustion air to a first pressure level, and directing the air at the first pressure level through a first cooler in a common housing. The method may also include further compressing the air to a second pressure level that is higher than the first pressure level after it has been cooled, and directing air at the second pressure level through a second cooler in the common housing. The method may further include redirecting cooled air from the second cooler into the engine.

DETAILED DESCRIPTION

Figure 1:
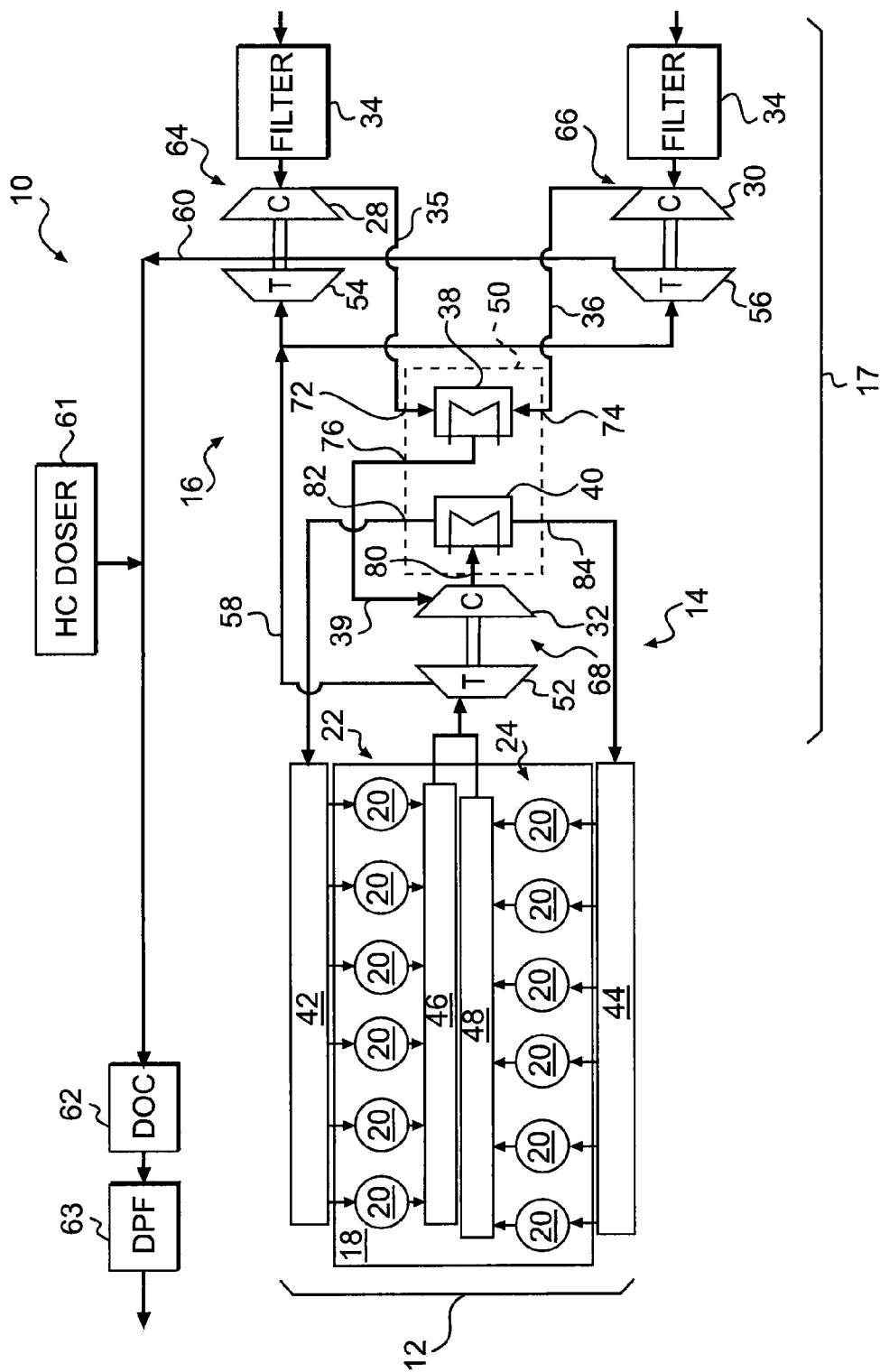
FIG. 1 is a schematic illustration of an exemplary disclosed power system.

FIG. 1 illustrates a power system 10 having an engine 12, an air induction system 14, and an exhaust system 16. For the purposes of this disclosure, engine 12 is depicted and described as a four-stroke diesel engine. One skilled in the art will recognize, however, that engine 12 may be any other type of combustion engine such as, for example, a two- or four-stroke gasoline or gaseous fuel-powered engine. Air induction system 14 may be configured to direct air or a mixture of air and fuel into engine 12 for combustion. Exhaust system 16 may be configured to direct combustion exhaust from engine 12 to the atmosphere. Air induction system 14 and exhaust system 16 may together form an air handling system 17.

Engine 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber. In the illustrated embodiment, engine 12 includes twelve cylinders 20 arranged in a V-configuration (i.e., a configuration having first and second banks 22, 24 or rows of cylinders 20). However, it is contemplated that engine 12 may include a greater or lesser number of cylinders 20 and that cylinders 20 may be arranged in an inline configuration, in an opposing-piston configuration, or in another configuration, if desired.

Air induction system 14 may include, among other things, at least one compressor and at least one air cooler located to cool air compressed by the compressor(s) before it enters the combustion chambers of engine 12. Each compressor may embody a fixed geometry compressor, a variable geometry compressor, or any other type of compressor configured to receive air and compress the air to a desired pressure level. In the disclosed exemplary embodiment, air induction system 14 has three compressors, including first and second low-pressure compressors 28, 30 disposed in parallel, and a high-pressure compressor 32 disposed downstream of first and second low-pressure compressors 28, 30. First and second low-pressure compressors 28, 30 may draw air through a corresponding filter 34, compress the air to a first pressure level, and direct the pressurized air to high-pressure compressor 32 via passages 35, 36. High-pressure compressor 32 may receive the pressurized air from low-pressure compressors 28, 30 and increase the pressure thereof to a higher level. It is contemplated that high-pressure and low-pressure may be relative terms and do not denote specific pressures. In one embodiment, high-pressure compressor 32 may compress air to a pressure level that is about two to five times the pressure level of the air compressed by low-pressure compressors 28, 30. A first cooler 38 may be located in fluid communication with passages 35, 36 to chill the air pressurized by both first and second low-pressure compressors 28, 30 before it is received by high-pressure compressor 32 via passage 39. A second cooler 40 may be disposed downstream of high-pressure compressor 32 (e.g., between high-pressure compressor 32 and first and second intake manifolds 42, 44) to further chill the air before it enters the combustion chambers of engine 12. First intake manifold 42 may be associated with first bank 22 of cylinders 20, while second intake manifold 44 may be associated with second bank 24. First and second coolers 38, 40 together may form a cooling assembly 50.

Coolers 38, 40 may both embody air-to-air heat exchangers, liquid-to-air heat exchangers, or combinations of both, and be configured to facilitate the transfer of thermal energy away from the compressed air directed into engine block 18 of power system 10. The thermal energy transferred away from the compressed air may be absorbed into a flow of low-pressure coolant, for example air, glycol, water, a water/glycol mixture, a blended air mixture, or another coolant known in the art.

Exhaust system 16 may include, among other things, at least one turbine driven by the exhaust from engine 12 to rotate the compressors of air induction system 14. Each turbine may embody a fixed geometry turbine, a variable geometry turbine, or any other type of turbine configured to receive exhaust and convert potential energy in the exhaust to a mechanical rotation. In the disclosed exemplary embodiment, exhaust system 16 has three turbines, including a high-pressure turbine 52, and first and second low-pressure turbines 54, 56 disposed in parallel at locations downstream of high-pressure turbine 52. Exhaust system 16 may also include a first exhaust manifold 46 and a second exhaust manifold 48 in separate communication with first and second banks 22, 24 of cylinders 20. High-pressure turbine 52 may receive exhaust from first and second banks 22, 24 of cylinders 20 via first and second exhaust manifolds 46, 48, remove a portion of the potential energy contained therein, and then distribute the exhaust to low-pressure turbines 54, 56 by way of a passage 58. After exiting low-pressure turbines 54, 56, the exhaust may be discharged to the atmosphere via a common passage 60. One or more exhaust treatment devices, for example a hydrocarbon doser 61, a diesel oxidation catalyst (DOC) 62, a diesel particulate filter (DPF) 63, and/or any other treatment device known in the art may be disposed within passage 60, if desired.

Figure 2:
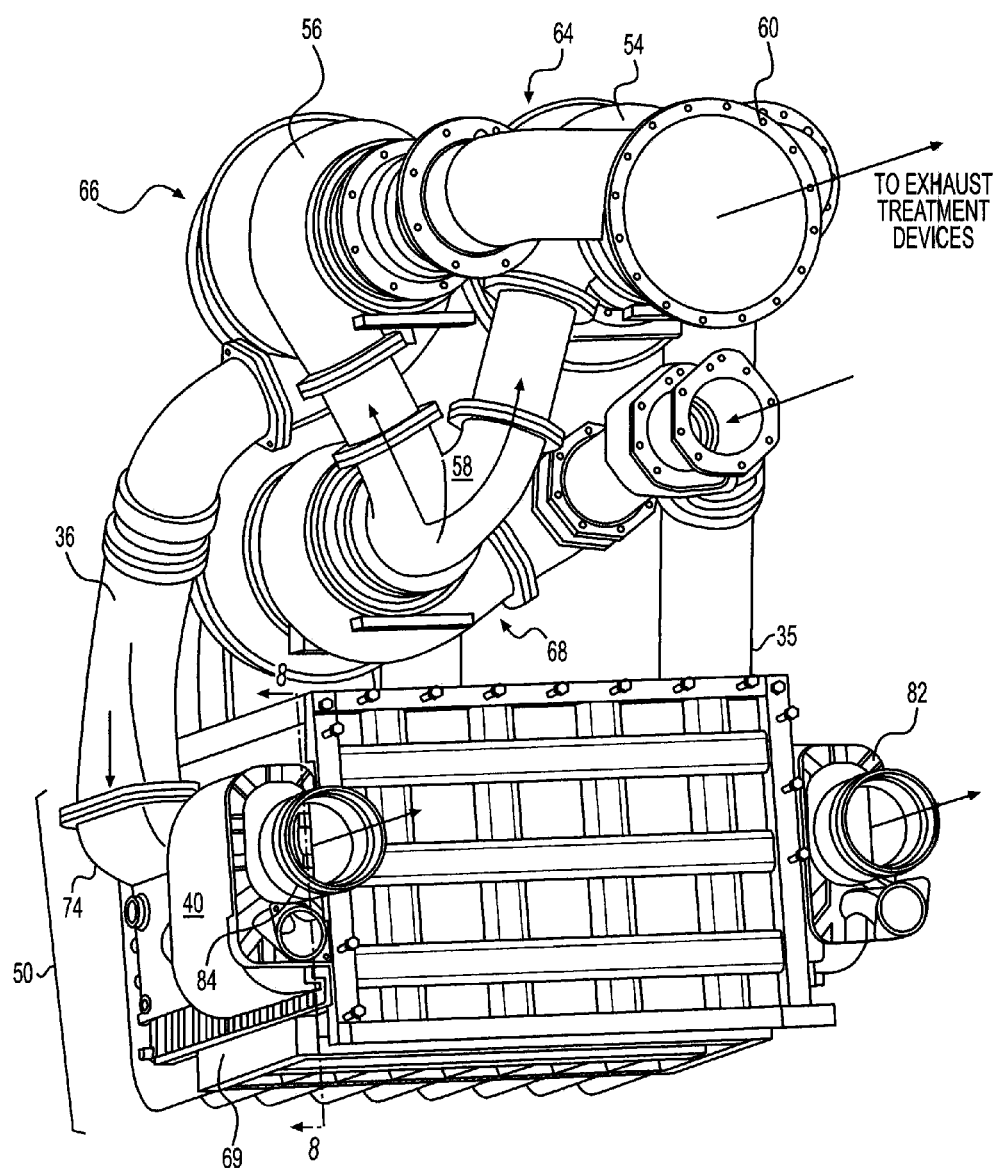
FIGS. 2 and 3 are isometric illustrations of an exemplary disclosed air handling system that may be used in conjunction with the power system of FIG. 1.
Figure 3:
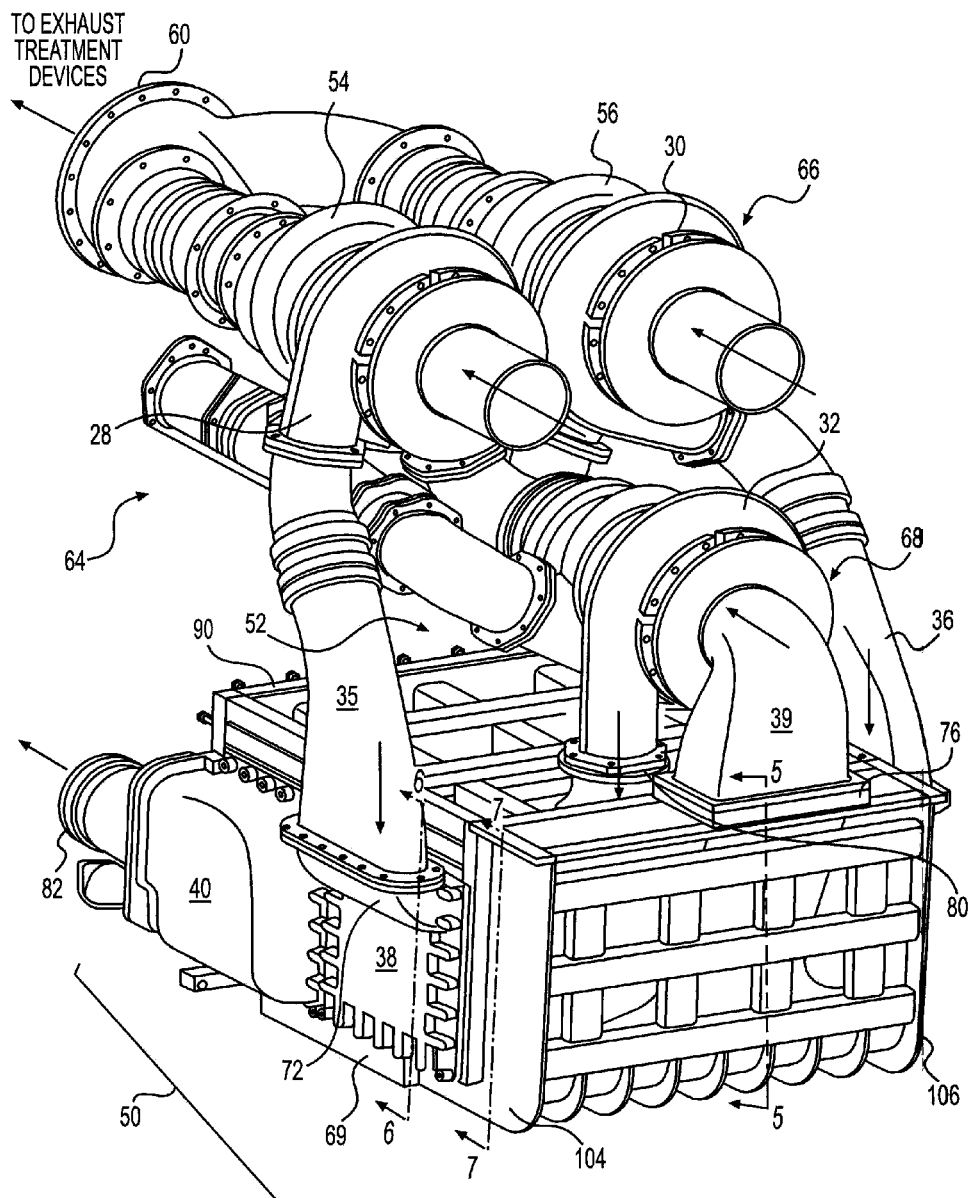

FIGS. 2 and 3 illustrate isometric views of a portion of air handling system 17 containing low-pressure compressors 28, 30, high-pressure compressor 32, low-pressure turbines 54, 56, and high-pressure turbine 52. As can be seen by these figures, low-pressure compressors 28, 30 and low-pressure turbines 54, 56 may form low-pressure turbochargers 64, 66, respectively. Low-pressure turbochargers 64, 66 may be disposed at a gravitationally higher position than high-pressure compressor 32 and high-pressure turbine 52, which together form a high-pressure turbocharger 68. High-pressure turbocharger 68, in turn, may be disposed at a gravitationally higher position than cooling assembly 50. Additionally, high-pressure turbocharger 68 may be located at a length-wise center of cooling assembly 50, in between low-pressure turbochargers 64, 66. The relative locations of low-pressure turbochargers 64, 66, high-pressure turbocharger 68, and cooling assembly 50 may provide a configuration having reduced external ducting, thereby lowering cost and an overall packaging size of air handling system 17.

Cooling assembly 50 may include a housing 69 made of high-strength steel (or another suitable material) for housing coolers 38, 40. Housing 69 may be configured to at least partially support low-pressure turbochargers 64, 66 and high-pressure turbocharger 68. For example, high-pressure turbocharger 68 may be mounted directly to a top surface 90 of housing 69 (e.g., an outlet scroll turbocharger 68 bolted to housing 69), and low-pressure turbochargers 64, 66 may connect to side surfaces 104, 106 of housing 69 via supporting passages 35, 36, respectively. It should be noted that side surfaces 104, 106 may be substantially parallel and opposite to one another, and side surfaces 104, 106 may both be generally perpendicular to top surface 90. Supporting passages 35, 36 may extend vertically from cooling assembly 50 and connect to low-pressure turbochargers 64, 66 at locations that are gravitationally higher than high-pressure turbocharger 68. High-pressure turbocharger 68 and supporting passages 35, 36 may be firmly attached to housing 69 using welds, bolts, rivets, fasteners, or by any other means of attachment known in the art. It is contemplated that, during operation, turbochargers 64, 66, 68 may experience large vibrations, and housing 69 may help to suppress these vibrations by at least partially supporting the weight of turbochargers 64, 66, 68. A pedestal (not shown) may connect cooling assembly 50 (and turbochargers 64, 66, 68) to a base platform (not shown) of engine 12.

In the disclosed embodiment, housing 69 may include a plurality of inlets and outlets configured to direct air through cooling assembly 50. For example, a first inlet 72 may be disposed in side surface 104 and be fluidly connected to low-pressure turbocharger 64 via passage 35. A second inlet 74 may be disposed in side surface 106 and be fluidly connected to low-pressure turbocharger 66 via passage 36. It should be noted that inlets 72, 74 may be substantially parallel to each other. A third inlet 80 may be disposed in top surface 90 and be directly connected to high-pressure turbocharger 68. In addition, a first outlet 76 may be disposed in top surface 90 and be fluidly connected to high-pressure turbocharger 68 via passages 39. A second outlet 82 may be disposed in side surface 104 and be fluidly connected to intake manifold 42. A third outlet 84 may be disposed in side surface 106 and be fluidly connected to intake manifold 44. It should be noted that outlets 82, 84 may be substantially parallel to each other. Inlets 72, 74, 80 may be positioned at an upper portion of cooling assembly 50 adjacent to turbochargers 64, 66, 68 in order to keep hot compressed gases away from a portion generally attached to engine 12.

Figure 4:
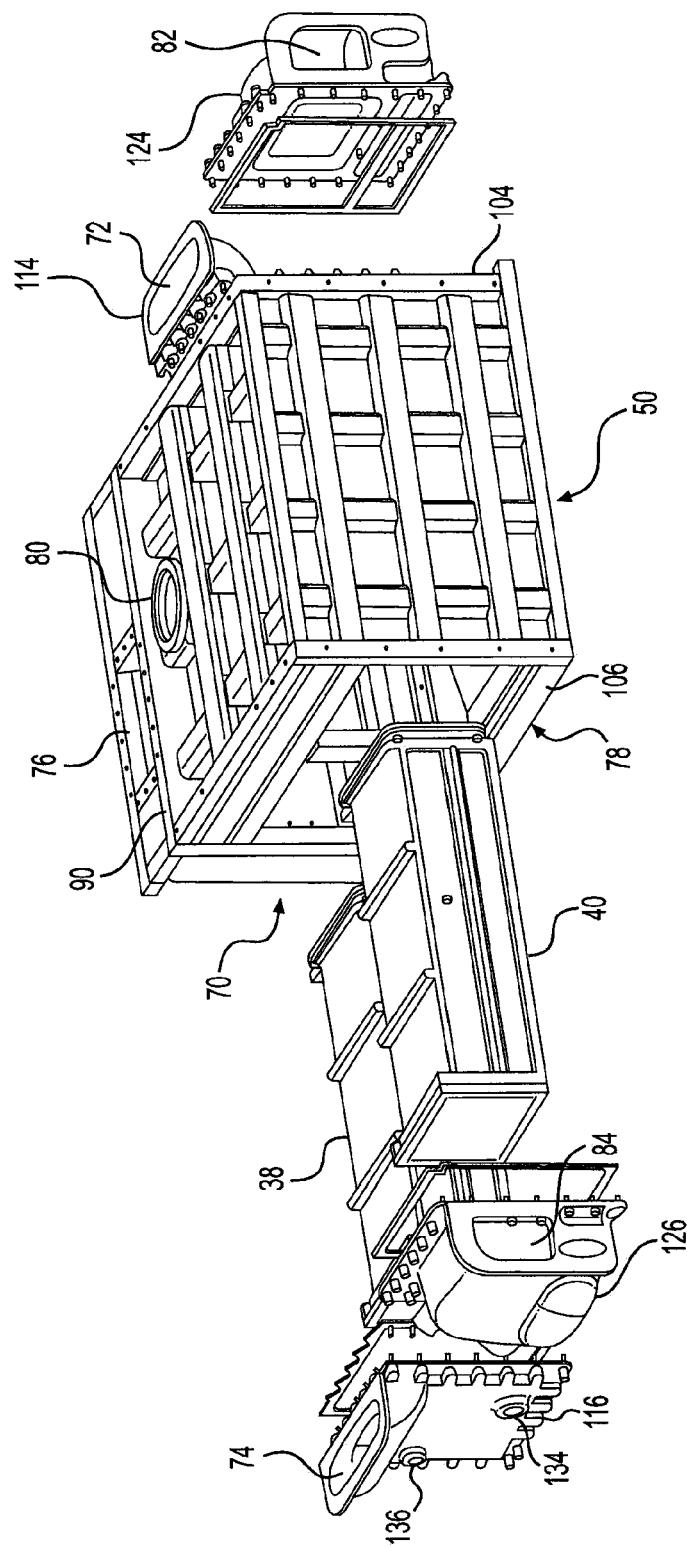
FIG. 4 is an exploded view illustration of an exemplary disclosed cooling assembly that may be used in conjunction with the air handling system of FIGS. 2 and 3.

FIG. 4 illustrates an exploded view of cooling assembly 50. As shown in this view, housing 69 may form a first chamber 70 connected with inlets 72, 74 and outlet 76, and a second chamber 78 adjacent to chamber 70 and connected with inlet 80 and outlets 82, 84. Cooler 38 may be disposed within chamber 70, while cooler 40 may be disposed within chamber 78. Both coolers 38, 40 may slide into chambers 70, 78, respectively, to allow for easy maintenance and/or replacement of coolers 38, 40.

In the disclosed embodiment, coolers 38, 40 are liquid-to-air heat exchanger cores that utilize water, glycol, or a water/glycol mixture to cool the air flowing through cooling assembly 50. That is, a flow of air may be directed through channels of coolers 38, 40 such that heat from the air is transferred to coolant flowing in adjacent channels. The coolant may be stored in a coolant tank (not shown), which may distribute coolant to other heat exchanger cores of engine 12 as well. A coolant pump (not shown) may be fluidly connected to the coolant tank and be configured to direct coolant towards one or more header tanks associated with coolers 38, 40. Each header tank may be configured to direct both air and coolant into coolers 38, 40 via separate passages. Each header tank may also be securely fastened to corresponding side surfaces 104, 106 using a plurality of mechanical fasteners, such as bolts, screws, rivets, or other types of mechanical connectors. As shown in FIG. 4, cooler 38 may be fluidly connected to header tanks 114, 116 that are disposed in side surfaces 104, 106, respectively. In some embodiments, a plurality of protrusions from header tanks 114, 116 may connect with a plurality of recesses of cooler 38 and be sealed with corresponding seals, such that air and coolant flow through separate channels from one end of cooler 38 to the other.

Coolant from the coolant pump may enter header tank 116 through a coolant inlet 134 and flow from a first end of cooler 38 through a first half of the coolant channels to a second opposite end of cooler 38. At the second end, the coolant may enter header tank 114, where it is recirculated into cooler 38, flowing in the opposite direction through the second half of the coolant channels. The coolant may then flow back into header tank 116 and exit through a coolant outlet 136. From coolant outlet 136, coolant may flow to another heat exchanger core to disperse heat from the coolant and then be redirected to other components of engine 12.

Also shown in FIG. 4, cooler 40 may be fluidly connected to header tanks 124, 126 that are disposed in side surfaces 104, 106, respectively. Header tanks 124, 126 may be connected to cooler 40 in a similar way that header tanks 114, 116 are connected to cooler 38, and coolant may flow through cooler 40 in a similar way that coolant flows through cooler 38. Also, like header tank 116, header tank 126 may have a coolant inlet and a coolant outlet (not shown) to allow coolant to enter and exit header tank 126. In the disclosed embodiment, coolers 38, 40 may be connected to the coolant pump in parallel such that coolers 38, 40 receive coolant through separate passages.

In addition to allowing fluid communication between the coolant pump and coolant channels of coolers 38, 40, each header tank 114, 116, 124, 126 may be connected to one of inlets 72, 74 or outlets 82, 84, allowing fluid communication between inlets 72, 74 or outlets 82, 84 and air channels of coolers 38, 40. For example, in one embodiment, inlets 72, 74 may be integral to header tanks 114, 116, respectively, such that air may enter header tanks 114, 116 and flow through air channels of cooler 38, thereby allowing heat from the air to be transferred to the coolant flowing in coolant adjacent channels. Also, outlets 82, 84 may be integral to header tanks 124, 126, respectively, such that air may exit air channels of cooler 40 and enter header tanks 124, 126. Integrating inlets 72, 74 and outlets 82, 84 into their respective header tanks 114, 116, 124, 126 may help to reduce complexity and cost. In some embodiments, one or both of header tanks 124, 126 may include a mixing chamber configured to mix compressed air with recirculated exhaust from at least one of exhaust manifolds 46, 48, if desired, allowing engine 12 to reuse combustion gases to improve emissions.

Figure 5:
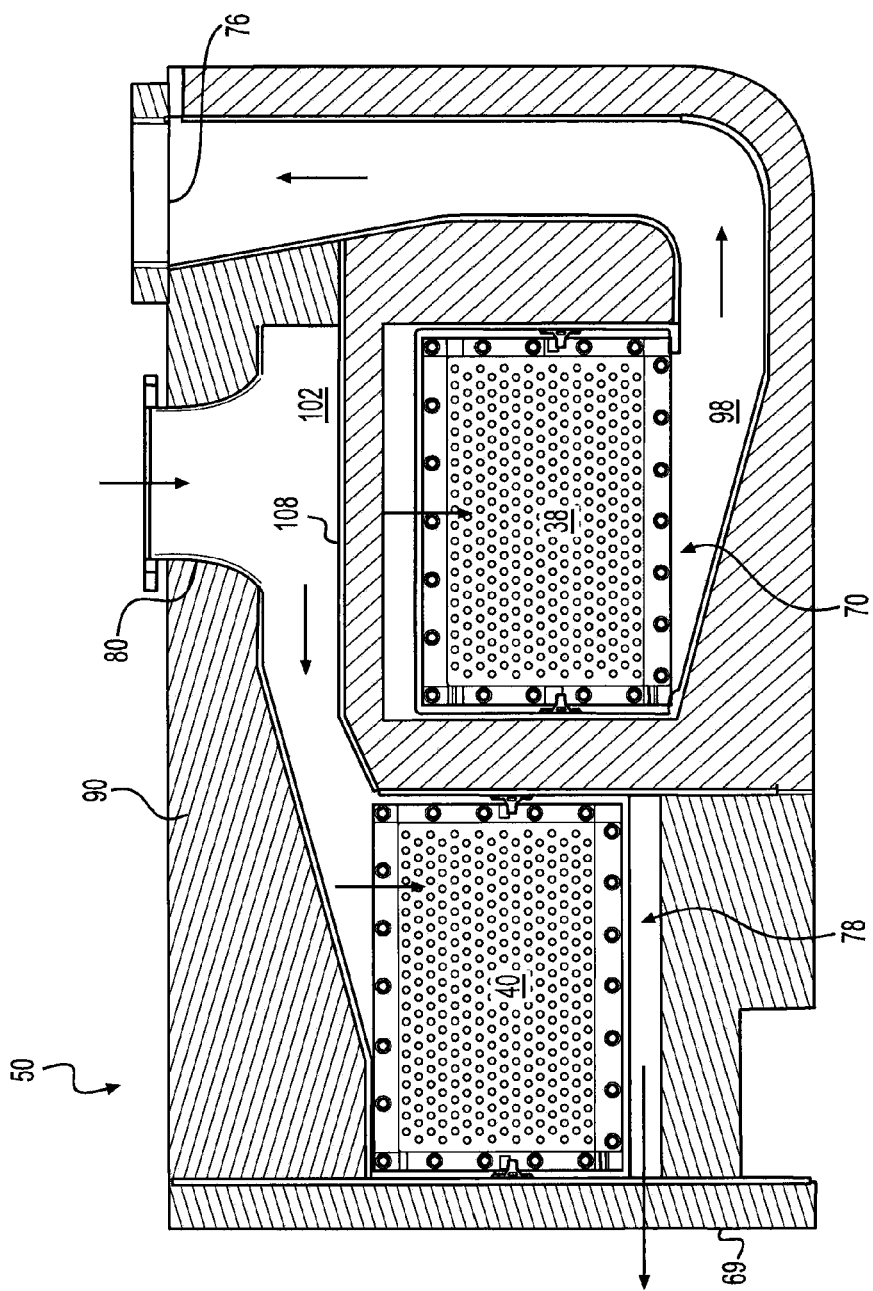
FIG. 5 is a cut-away view illustration of the disclosed cooling assembly taken along line 5-5 of the air handling system of FIG. 3.

FIG. 5 illustrates a cut-away view of cooling assembly 50 taken along line 5-5 of air handling system 17 shown in FIG. 3. As shown in this view, chamber 70 may be substantially isolated from chamber 78, thereby isolating cooler 38 from cooler 40. Chambers 70, 78 may be separated by one or more walls and sealed by using one or more gaskets (or any other sealant known in the art) such that chambers 70, 78 may have substantially different temperatures, pressures, and/or flow rates. During operation, chamber 78 may be subject to generally higher temperatures and pressures than chamber 70, because air flowing from high-pressure compressor 32 may have substantially higher pressures and temperatures than the air flowing from low-pressure compressors 28, 30. Isolating and sealing chambers 70, 78 may help to reduce leakage between the chambers, thereby enhancing performance of coolers 38, 40. The one or more separation walls may be shared by chambers 70, 78 and be configured to balance pressure internally, thus keeping the internal structure compact and reducing a need for additional structural support and/or fabrication of the internal structure.

Also shown in FIG. 5, one or more passages may be formed within housing 69 that allow air to flow into and out of chambers 70, 78. For example, a first passage 98 may extend from a bottom of chamber 70 to outlet 76, allowing fluid communication between cooler 38 and passage 39. A second passage 102 may extend from inlet 80 to a top of chamber 78, allowing fluid communication between high-pressure compressor 32 and cooler 40. Passage 102 may vary in cross-sectional area from inlet 80 to the top of chamber 78. For example, passage 102 may gradually increase its width from a generally narrow section adjacent to inlet 80 to a generally wide section adjacent to the top of chamber 78. A structural wall 108 may at least partially define passage 102 and be disposed substantially normal to a high velocity flow stream of air from high-pressure compressor 32, such that, upon impact with structural wall 108, the flow stream diffuses in a generally perpendicular direction. As a result, the diffused flow stream may continue through passage 102 with a reduced velocity and provide substantially uniform flow distribution across a face of cooler 40.

Figure 6:
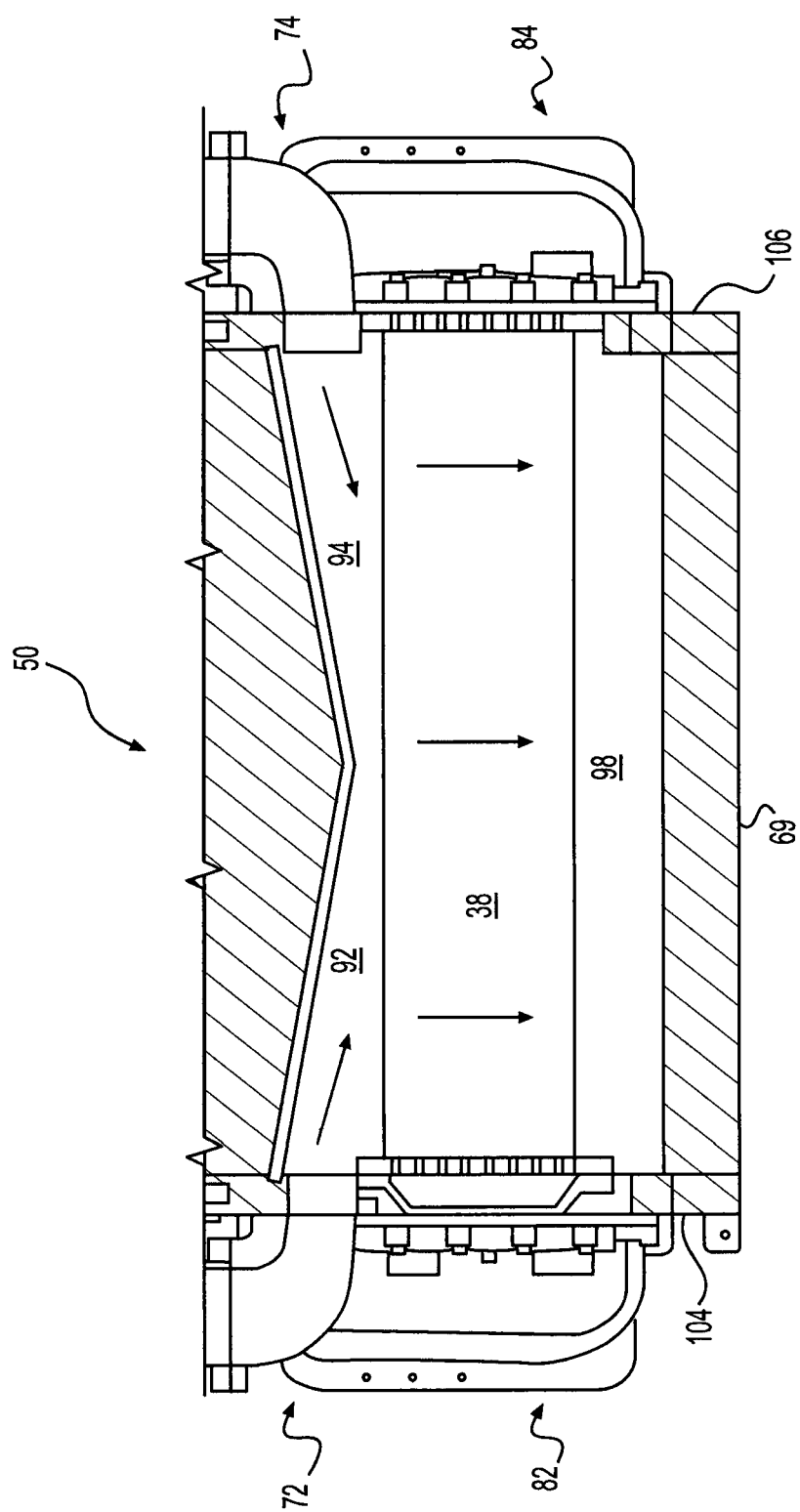
FIG. 6 is a cut-away view illustration of the disclosed cooling assembly taken along line 6-6 of the air handling system of FIG. 3.

FIG. 6 illustrates a cut-away view of cooling assembly 50 taken along line 6-6 of air handling system 17 shown in FIG. 3. As shown in this view, additional passages 92, 94 may extend from inlets 72, 74, respectively, to a top surface of cooler 38. Passages 92, 94 may have generally triangular cross-sections, such that the passages vary in cross-sectional area from side surfaces 104, 106, respectively, to a center of housing 69. For instance, a cross-sectional area of passage 92 may be larger adjacent to side surface 104 relative to a cross-sectional area of passage 92 adjacent to the center of housing 69. Forcing air to flow through a decreasing cross-sectional area of passage 92 may increase the pressure adjacent the center of housing 69. The increased pressure adjacent the center of housing 69 may help direct air from passage 92 to enter cooler 38 located adjacent the center of housing 69. Additionally, the increased pressure adjacent the center of housing 69 may force air in passage 92 to enter cooler 38 located closer to side surface 104. Passage 94 may decrease in cross-sectional area from side surface 106 to the center of housing 69 in a similar manner, thereby providing a similar pressure distribution. As a result, the decreasing cross-sectional areas of passages 92, 94 may distribute air substantially equally across a face of cooler 38. The triangular cross-sections of passages 92, 94 at opposing ends of cooler 38 may also allow generally vertical oriented flow streams from passages 35, 36 to transition smoothly into passages 92, 94, thereby reducing vortex generation in the air flow.

Figure 7:
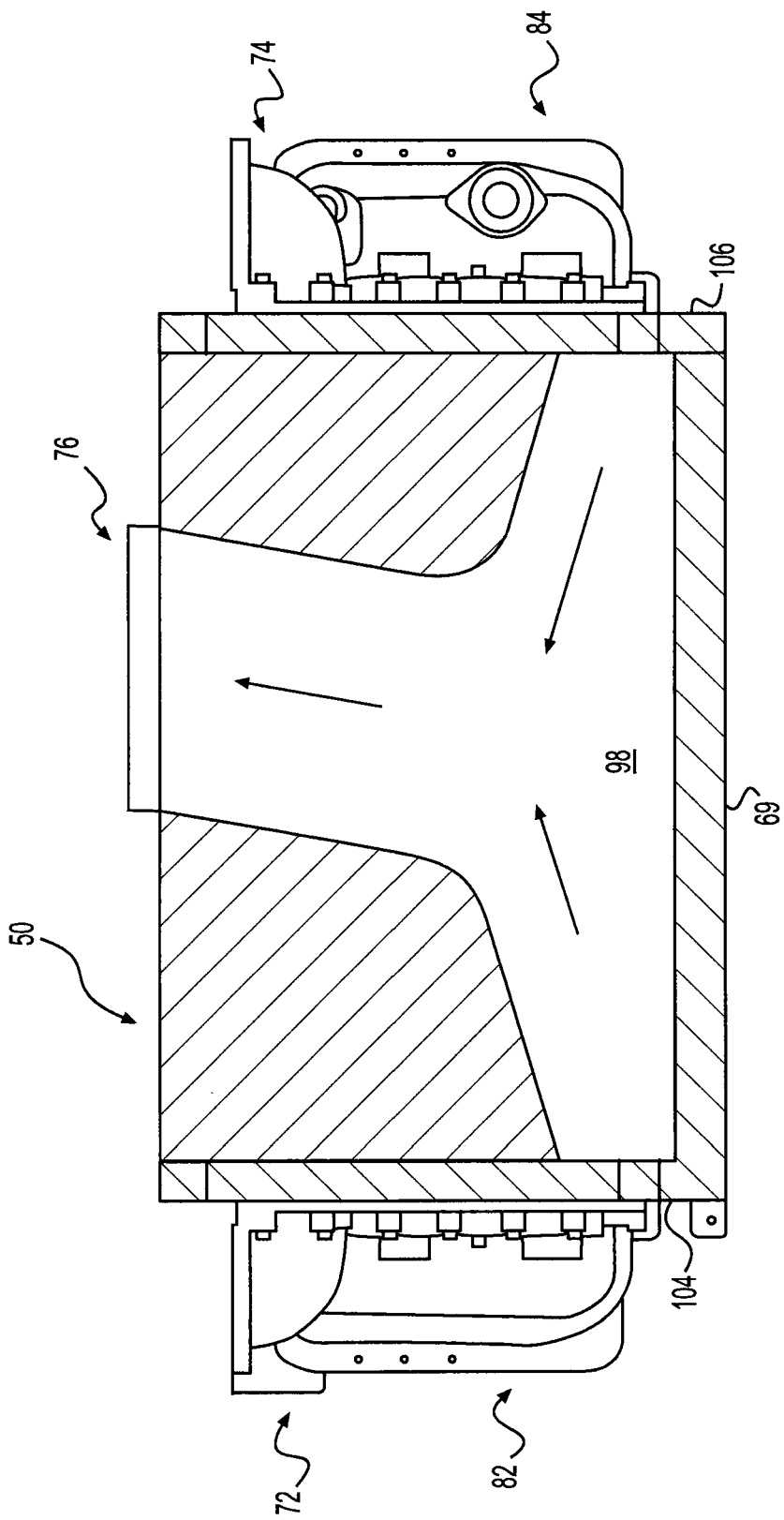
FIG. 7 is a cut-away view illustration of the disclosed cooling assembly taken along line 7-7 of the air handling system of FIG. 3.

FIG. 7 illustrates a cut-away view of cooling assembly 50 taken along line 7-7 of air handling system 17 shown in FIG. 3. As shown in this view, passage 98 may vary in cross-sectional area from the bottom of chamber 70 (referring to FIG. 5) to outlet 76. For example, passage 98 may rapidly decrease its width from a generally wide section adjacent to the bottom of chamber 70 to a generally narrow section adjacent to outlet 76. By rapidly decreasing the width of passage 98, this may accelerate and compact the air flow into a smaller volume flow stream that is more suitable for delivery into high-pressure compressor 32. Additionally, compacting the flow stream may equalize mass flow across the width of passage 98, thereby providing a uniform flow distribution going into high-pressure compressor 32. Uniform flow into high-pressure compressor 32 may be important to reduce high cyclical stresses on one or more components of high-pressure compressor 32.

Figure 8:
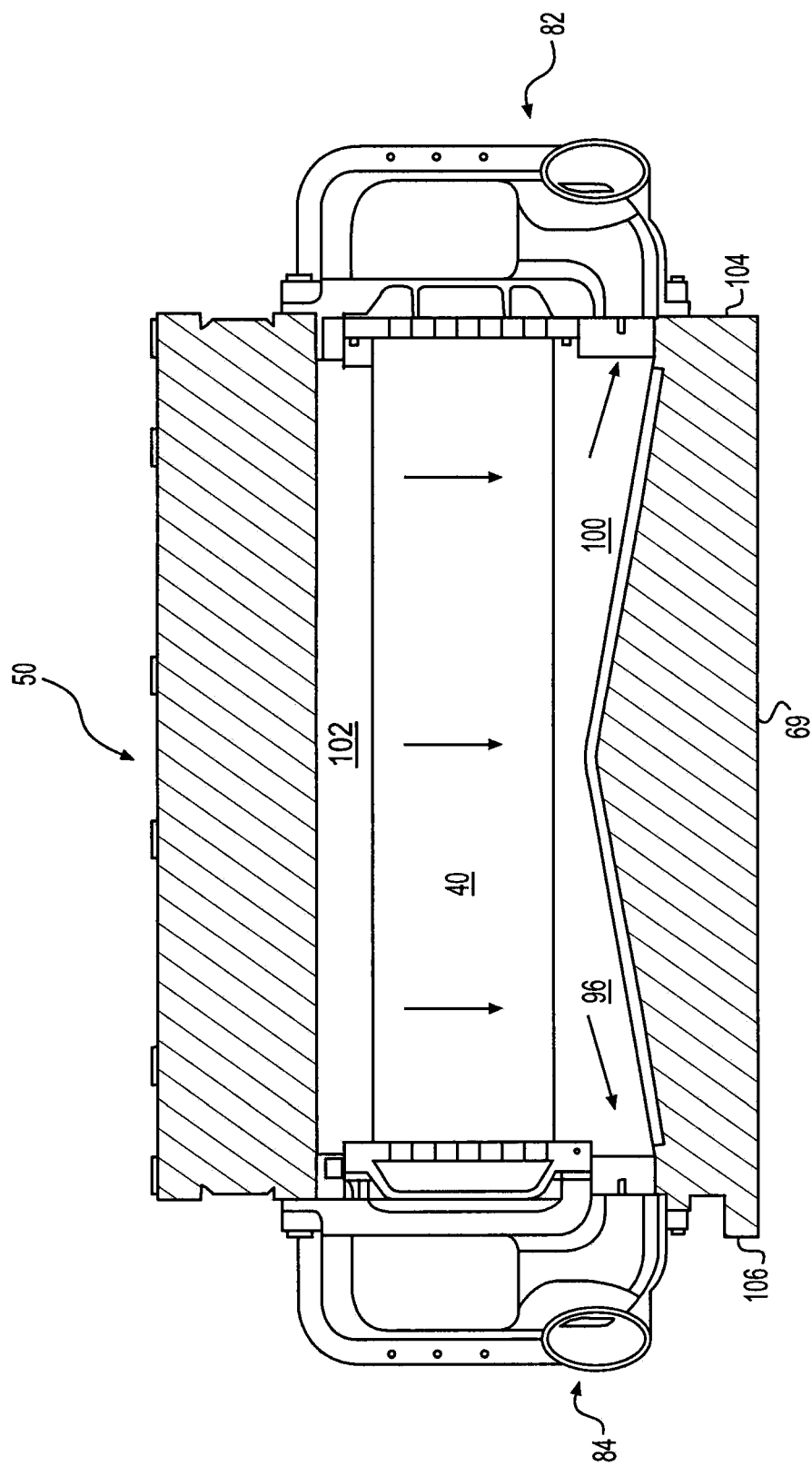
FIG. 8 is a cut-away view illustration of the disclosed cooling assembly taken along line 8-8 of the air handling system of FIG. 2.

FIG. 8 illustrates a cut-away view of cooling assembly 50 taken along line 8-8 of air handling system 17 shown in FIG. 2. As shown in this view, additional passages 96, 100 may extend from a bottom surface of cooler 40 to outlets 84, 82, respectively. Like passages 92, 94, passages 96, 100 may have generally triangular cross-sections, such that passages 96, 100 vary in cross-sectional area between the center of housing 69 and side surfaces 106, 104, respectively. For example, passage 96 may gradually increase its cross-sectional area from the center of housing 69 to side surface 106. Increasing the cross-sectional area of passage 96 may help diffuse the air and increase static pressure adjacent surface side 106 at outlet 84. Increasing the static pressure near outlet 84 in this manner may help to provide a uniform flow of air and allow combustion gases from header tank 126 to evenly mix with the air. Passage 100 may increase in cross-sectional area from the center of housing 69 to side surface 104 in a similar manner, thereby providing a similar pressure distribution and allowing air to evenly mix with combustion gases in header tank 124. As a result, the increasing cross-sectional area of passages 96, 100 may provide a uniform flow of air and combustion gases out of cooling assembly 50 and into intake manifolds 42, 44.

INDUSTRIAL APPLICABILITY

The disclosed cooling assembly 50 may be implemented into any power system application where charged air induction is utilized. The disclosed cooling assembly 50 may be simple and robust, and offer enhanced application opportunities because of its compact size. In particular, coolers 38, 40, being located within common housing 69, may reduce an overall packaging size of air handling system 17. Coolers 38, 40 may also be substantially isolated from each other, allowing for different pressures, temperatures, and flow rates between the coolers.

In addition, the plumbing configuration of turbochargers 64, 66, 68 in relation to cooling assembly 50 may further reduce the overall packaging size of air handling system 17, while still maintaining the necessary performance and efficiency. For example, turbochargers 64, 66, 68 and cooling assembly 50 may be positioned at different gravitational heights in order to reduce external ducting and costs associated with the extra ducting. Turbochargers 64, 66, 68 may also be at least partially supported by cooling assembly 50, thereby reducing a need for additional support structures.

Referring to FIGS. 2 and 3, air may be drawn into first and second low-pressure compressors 28, 30 and be compressed to a first pressure level. The pressurized air may exit first and second compressors 28, 30 and be redirected in a downward direction towards cooling assembly 50 via passages 35, 36, respectively.

Referring to FIG. 6, after passing through passages 35, 36, the pressurized air may enter cooling assembly 50 through inlets 72, 74 and be redirected towards cooler 38 in two separate flow streams via passages 92, 94, respectively. Prior to entering cooler 38, the two flow streams may be directed towards each other in generally opposite directions from side surfaces 104, 106 towards the center of housing 69. The pressurized air may then travel through air channels of cooler 38 in a generally downward direction. As the pressurized air flows through cooler 38, coolant may be drawn from the coolant tank by the coolant pump, pushed into header tank 116 via inlet 134, and enter coolant channels of cooler 38. The coolant flowing through the coolant channels may absorb thermal energy from the pressurized air flowing through adjacent air channels.

Referring to FIG. 7, after flowing through cooler 38, cooled air may be redirected in an upward direction through passage 98 towards outlet 76. While flowing through passage 98, the cooled air may rapidly converge into a smaller volume flow stream prior to reaching outlet 76. From outlet 76, the compacted air may then exit cooling assembly 50 and be drawn into high-pressure compressor 32 via passage 39. High-pressure compressor 32 may compress the cooled air to a second pressure level that is greater than the first pressure level and redirect the pressurized air back towards cooling assembly 50.

Referring to FIG. 5, the pressurized air from high-pressure compressor 32 may flow through inlet 80, where it may be redirected towards cooler 40 via passage 102. Before entering cooler 40, the pressurized air may impact structural wall 108 and be diffused in a generally perpendicular direction. As the pressurized air flows through cooler 40, coolant may be drawn from the coolant tank by the coolant pump, pushed into header tank 126 via the coolant inlet, and enter coolant channels of cooler 40. The coolant flowing through the coolant channels may absorb thermal energy from the pressurized air flowing through adjacent air channels.

Referring to FIG. 8, the pressurized air may flow through air channels of cooler 40 in a generally downward direction. After exiting cooler 40, the cooled air may be divided into two substantially equal flow streams. The two flow streams may flow through passages 96, 100 away from each other in generally opposite directions from a center of housing 69 towards opposite side surfaces 106, 104, respectively. At side surfaces 104, 106, the cooled air may be redirected out of cooling assembly 50 through outlets 82, 84 and directed towards intake manifolds 42, 44 of engine 12 for combustion.

Cooling assembly 50 may promote uniform pressure distribution through its internal passages, while still providing a compact size of air handling system 17. For example, the decreasing cross-sectional area of passages 92, 94 may cause pressurized air to be distributed across the face of cooler 38 in a substantially uniform manner, while the increasing cross-sectional area of passages 96, 100 may force cooled air out of cooling assembly 50 in an increased velocity. Cooling assembly 50 may also efficiently utilize space available within housing 69 to provide a compact cooling assembly, while still achieving the required air cooling.

It will be apparent to those skilled in the art that various modifications and variations can be made to the disclosed cooling assembly. Other embodiments will be apparent to those skilled in the art from consideration of the specification and practice of the disclosed cooling assembly. It is intended that the specification and examples be considered as exemplary only, with a true scope being indicated by the following claims and their equivalents.

What is claimed is:

1. A cooling assembly for an air handling system, comprising:
    a housing having a first side surface, a second side surface that is parallel with and opposite to the first side surface, and a top surface that is perpendicular to the first and second side surfaces, the housing at least partially defining:
        a first chamber;
        first and second inlets disposed in the first and second side surfaces and configured to direct air into the first chamber in parallel;
        a second chamber adjacent to and isolated from the first chamber; and
        first and second outlets disposed in the first and second side surfaces and configured to direct air out of the second chamber in parallel;
        a third outlet disposed in the top surface and configured to direct air out of the first chamber; and
        a third inlet disposed in the top surface and configured to direct air into the second chamber;
    a first cooler disposed in the first chamber; and
    a second cooler disposed in the second chamber.

2. The cooling assembly of claim 1, wherein:
    the first inlet and the first outlet are disposed in the first side surface; and
    the second inlet and the second outlet are disposed in the second side surface.

3. The cooling assembly of claim 1, further including:
    a first header tank disposed in the first side surface and fluidly connected to the first cooler; and
    a second header tank disposed in the first side surface and fluidly connected to the second cooler.

4. The cooling assembly of claim 3, wherein the second header tank includes a mixing chamber configured to mix compressed air with recirculated exhaust prior to entering an intake manifold of the engine.

5. The cooling assembly of claim 3, wherein:
    the first inlet is integral to the first header tank; and
    the first outlet is integral to the second header tank.

6. The cooling assembly of claim 3, wherein the first header tank includes:
    an inlet configured to direct coolant into the first cooler; and
    an outlet configured to direct coolant out of the first cooler.

7. The cooling assembly of claim 1, further including:
    a first passage extending from the first inlet to a top surface of the first cooler; and
    a second passage extending from the second inlet to the top surface of the first cooler.

8. The cooling assembly of claim 7, wherein:
    the first passage decreases in cross-sectional area from the first side surface to a center of the housing; and
    the second passage decreases in cross-sectional area from the second side surface to the center of the housing.

9. The cooling assembly of claim 1, further including:
    a first passage extending from a bottom surface of the second cooler to the first outlet; and
    a second passage extending from the bottom surface of the second cooler to the second outlet.

10. The cooling assembly of claim 9, wherein:
    the first passage increases in cross-sectional area from a center of the housing to the first side surface; and
    the second passage increases in cross-sectional area from the center of the housing to the second side surface.

11. The cooling assembly of claim 1, further including:
    a first passage extending from a bottom of the first chamber to the third outlet; and
    a second passage extending from the third inlet to a top of the second chamber.

12. The cooling assembly of claim 11, wherein the first passage gradually decreases its width from the bottom of the first chamber to the third outlet.

13. The cooling assembly of claim 11, wherein the second passage gradually increases its width from the third inlet to the top of the second chamber.

14. The cooling assembly of claim 13, further including a structural wall at least partially defining the second passage and disposed normal to a stream of air flowing through the third inlet.

15. The cooling assembly of claim 1, wherein:
    the first cooler is configured to receive pressurized air from a pair of upstream compressors in parallel and discharge the air to a single compressor downstream; and
    the second cooler is configured to receive pressurized air from the single compressor and discharge the air to an intake manifold of an engine.

16. The cooling assembly of claim 1, wherein the first and second chambers have different pressures, temperatures, and/or flow rates during operation.

17. The cooling assembly of claim 16, wherein the second chamber has a higher pressure than the first chamber during operation.

18. The cooling assembly of claim 1, wherein the first and second coolers are liquid-to-air heat exchangers.

19. A method of handling combustion air for an engine including a first cooler and a second cooler disposed in a common housing, comprising:
    compressing, via at least a first compressor, the combustion air to a first pressure level;
    directing, via two parallel inlets in the common housing, the air at the first pressure level through the first cooler;
    further compressing, via a second compressor, the air to a second pressure level that is higher than the first pressure level after it has been cooled;
    directing, via a single inlet, air at the second pressure level through the second cooler; and
    directing, via two parallel outlets in the common housing, cooled air from the second cooler into the engine.

20. The method of claim 19, further including directing, via the two parallel inlets, air towards each other prior to entering the first cooler.

21. The method of claim 19, further including:
    dividing, via at least one passage, the cooled air exiting the second cooler into equal first and second flow streams; and
    directing, via the at least one passage, the first and second flow streams away from each other.

22. The method of claim 19, further including compacting, via at least one passage, cooled air from the first cooler into a smaller volume prior to directing the cooled air out of the common housing.

23. The method of claim 19, further including diffusing, via at least one passage, the air at the second pressure level in a perpendicular direction prior to entering the second cooler.

24. The method of claim 19, further including directing, via separate passages, coolant towards the first and second coolers.

25. The method of claim 19, further including:
   directing, via a first header tank, coolant from a first end of the first cooler towards a second end of the first cooler; and
   redirecting, via a second header tank, the coolant from the second end back towards the first end.

26. An air handling system, comprising:
   a first low-pressure turbocharger having a first compressor;
   a second low-pressure turbocharger having a second compressor;
   a high-pressure turbocharger fluidly connected to the first and second low-pressure turbocharger, the high-pressure turbocharger having a third compressor;
   a cooling assembly fluidly connected to the high-pressure turbocharger and the first and second low-pressure turbochargers, the cooling assembly having:
   a housing having a first side surface, a second side surface that is parallel with and opposite to the first side surface, and a top surface that is perpendicular to the first and second side surfaces, the housing at least partially defining:
   a first chamber;
   first and second inlets disposed in the first and second side surfaces and configured to receive pressurized air from the first and second low-pressure compressors in parallel and direct the air into the first chamber;
   a single outlet disposed in the top surface and configured to direct air out of the first chamber;
   a second chamber adjacent to and isolated from the first chamber;
   a single inlet disposed in the top surface and configured to receive pressurized air from the third compressor and direct the air into the second chamber;
   first and second outlets disposed in the first and second side surfaces and configured to direct air out of the second chamber in parallel;
   a first cooler disposed in the first chamber; and
   a second cooler disposed in the second chamber.

* * * * *